United States Patent Office 3,343,681
Patented Sept. 26, 1967

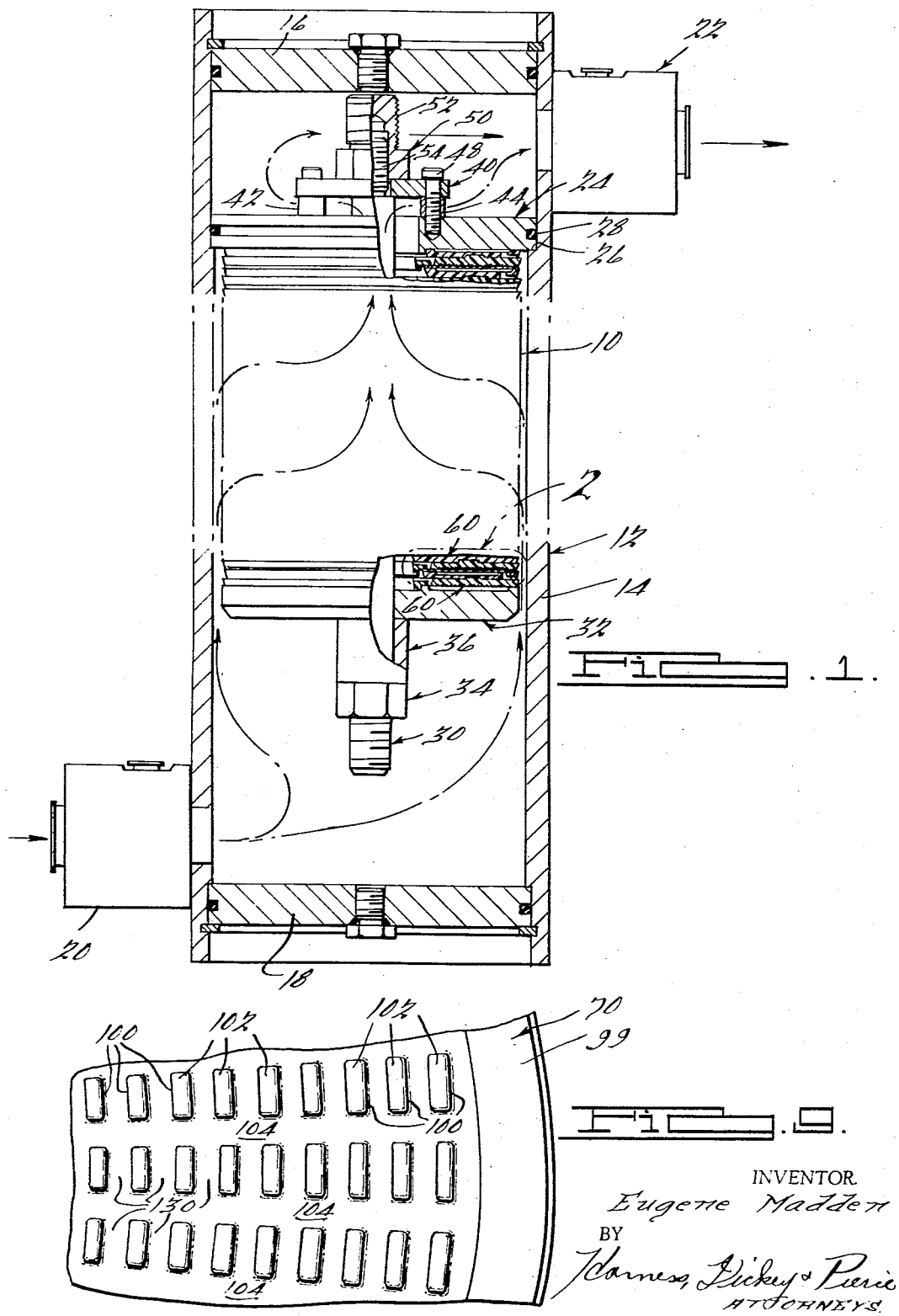

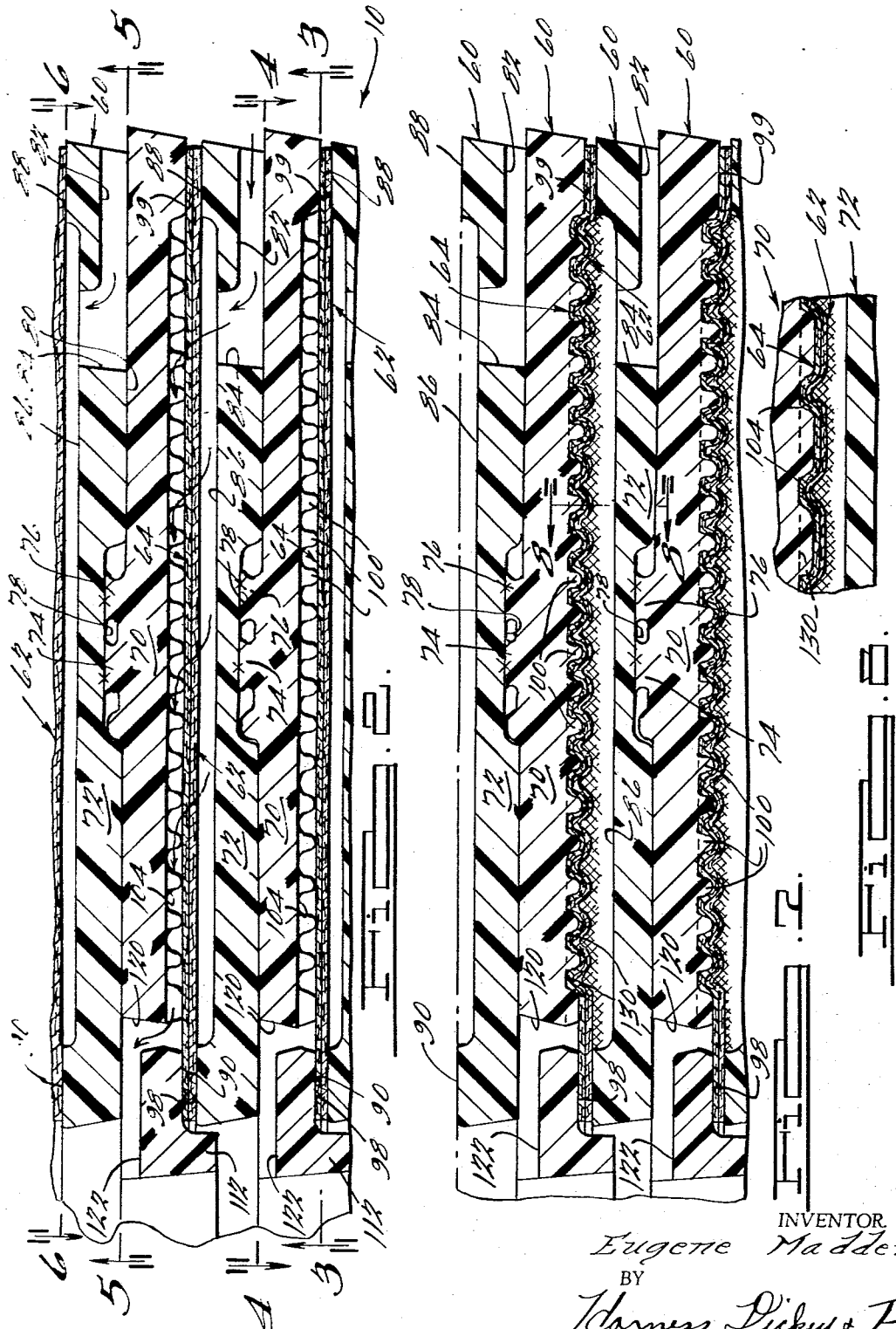

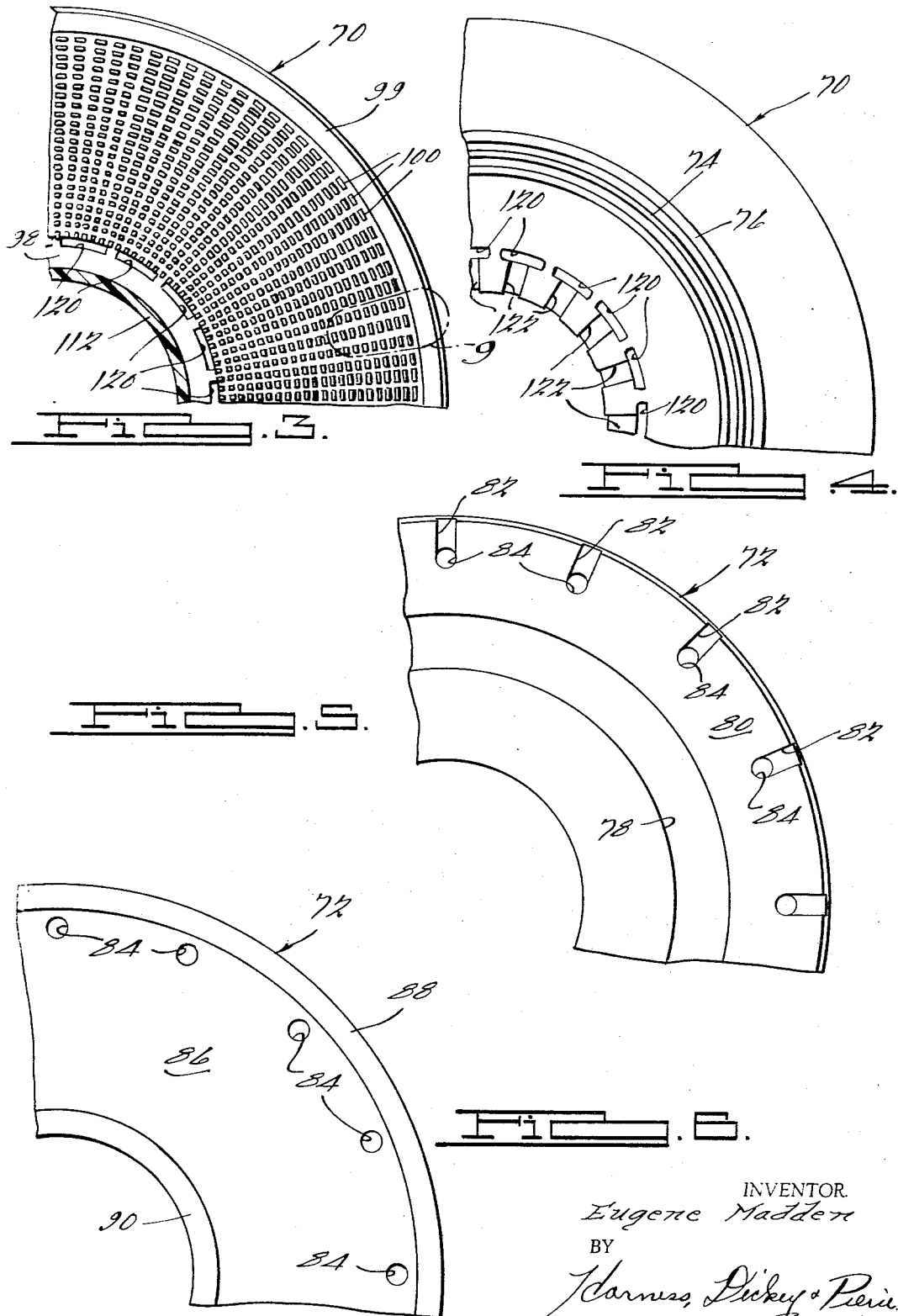

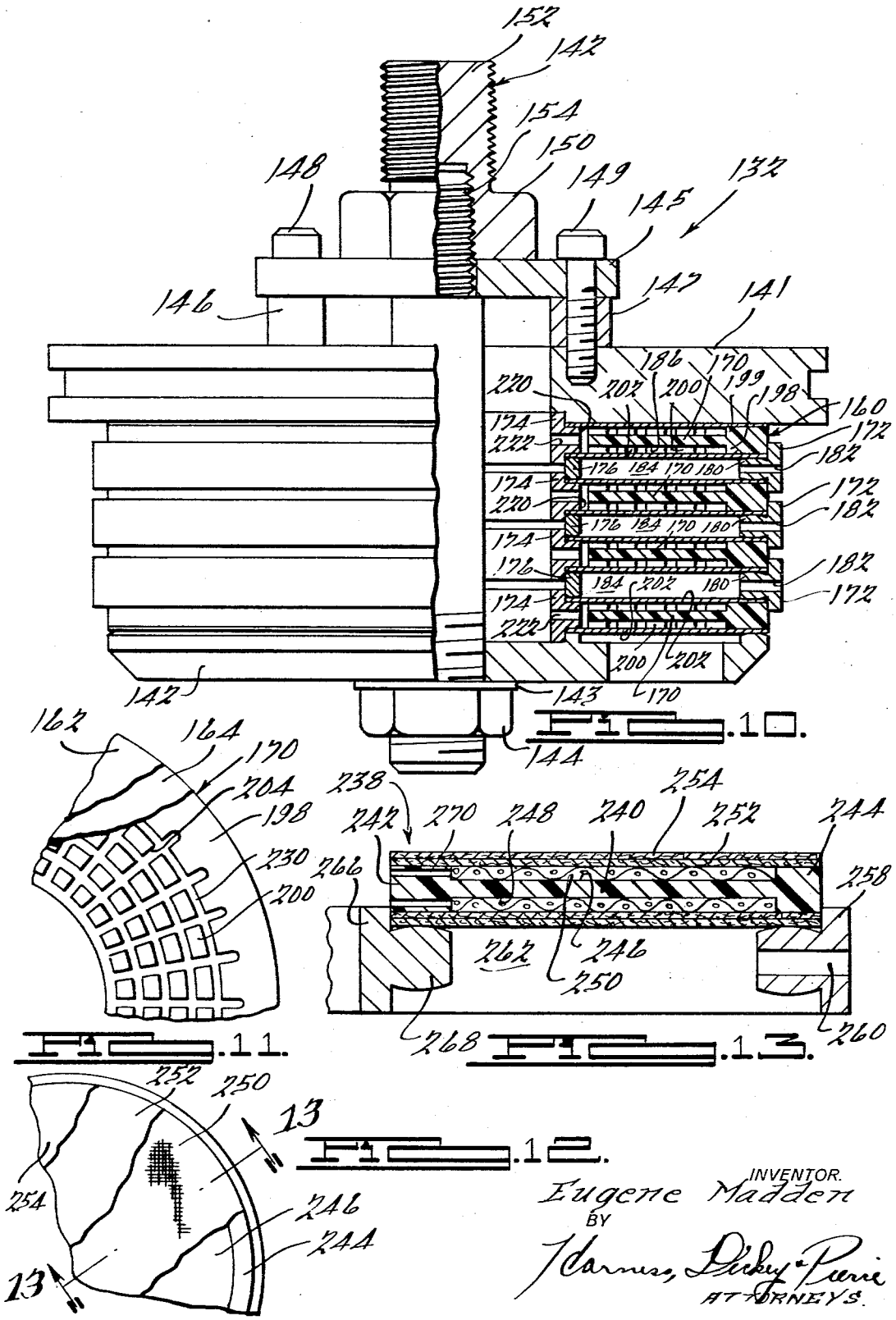

3,343,681
RUPTURE PROOF FILTER ASSEMBLY
Eugene Madden, Detroit, Mich., assignor to Cox Instruments, Division Lynch Corporation, Detroit, Mich., a corporation of Indiana
Filed Nov. 23, 1965, Ser. No. 514,749
15 Claims. (Cl. 210—343)

This application is a continuation-in-part of an application filed Dec. 26, 1962, and bearing Ser. No. 246,973 now abandoned. This invention relates generally to filters, and more particularly to an improved filter element for a fluid filter capable of separating ultrafine particles and contaminants from a fluid.

The stringent performance requirements placed on the fluid systems of, for example, aerospace vehicles and supporting apparatus, have dictated entirely new standards of fluid system cleanliness. Filters heretofore known and used have proved to be inadequate to fulfill the requirements of such applications in that fluid system failure has, in some instances been attributed to the presence of fluid contaminants. Also, the use of filters in certain systems has impressed the requirement that the filter withstand extremely high temperatures and pressures and possess chemical, biological and radiological inertness to the media being filtered.

Thus, the broad object of the instant invention is an improved filter element for a fluid filter that is capable of cleaning and maintaining a fluid system at a heretofore unachieved standard of cleanliness.

Another object of the present invention is to provide an improved filter element having certain desired characteristics, as for example the capability of withstanding relatively high temperatures and pressures and possessing relative inertness to certain chemical, biological and radiological characteristics of the media to be filtered.

Filtration of ultrafine particles, for example, particles in the order of .005 to 5 microns, is best achieved by a membrane-type filter. Such membranes are readily available commerically and have proved to be relatively efficient.

Accordingly, another object of the instant invention is an improved filter element that utilizes a filter membrane.

However, filter membranes are relatively susceptible to failure and thus have heretofore imposed severe operating limitations on a fluid system. One source of failure of the filter membrane in filters heretofore known and used is "piercing" of the membrane due to impact of particles therewith. This occurs when the velocity of the fluid immediately prior to passage through the membrane is relatively high or uncontrolled.

Accordingly, another object of the instant invention is a suitable support means for a filter membrane that precludes "piercing" of the membrane due to impingement of particles therewith.

Yet another desirable feature of a fluid filter is that the differential pressure thereacross be relatively constant and independent of loading of the filter element. This requirement becomes critical in fluid systems in which variable system pressures cannot be tolerated.

Thus, another object of the instant invention is a filter that exhibits a relatively constant differential pressure drop which is independent of loading of the filter element.

Yet another desirable feature of a fluid filter is that complete loading of the filter element effects stoppage of fluid flow through the filter. However, stoppage of fluid flow through the filter must be achieved without risking the chance of rupture of the filter membrane, which would dump contaminants into the fluid system and negate the very purpose for which the filter is installed in the system.

Accordingly, yet another object of the instant invention is a fluid filter that effects complete choke-off of fluid flow therethrough upon full loading of the filter element.

Still another object of the present invention is to provide an improved filter assembly having characteristics which reduce the possibility of fracture of the filter membrane.

It is desirable for a fluid filter to be capable of meeting varied application requirements by utilizing standard parts. Inventory problems are thus eliminated and delivery can be materially expedited.

Accordingly, yet another object of the instant invention is a filter element comprising a plurality of like components, the number of which determines the overall characteristics of the filter.

Certain filter designs presently available are of the type which are dynamically unbalanced. In filters of this type, the element construction is such that an unbalance of forces on the element is created to provide a resultant force which tends to crush the assembly. However, filter elements in the high pressure range, 3000 p.s.i. and above, are in need and require a dynamically balanced filter.

Accordingly, it is an object of the present invention to provide an improved filter assembly which is capable of withstanding high pressures.

Other objects and advantages of the instant invention will be apparent from the following specification, claims and drawings, wherein:

FIGURE 1 is a sectional view of a fluid filter utilizing the improved filter element of the instant invention;

FIG. 2 is an enlarged fragmentary view taken substantially within the circle 2 of FIGURE 1;

FIG. 3 is a cross-sectional view taken substantially along the line 3—3 of FIG. 2;

FIG. 4 is a cross-sectional view taken substantially along the line 4—4 of FIG. 2;

FIG. 5 is a cross-sectional view taken substantially along the line 5—5 of FIG. 2;

FIG. 6 is a cross-sectional view taken substantially along the line 6—6 of FIG. 2;

FIG. 7 is a fragmentary sectional view similar to FIG. 2 showing the filter membrane in the fluid "choke off" condition;

FIG. 8 is a cross-sectional view taken substantially along the line 8—8 of FIG. 7;

FIG. 9 is an enlarged fragmentary view taken substantially within the circle 9 of FIG. 3;

FIG. 10 is a sectional view of a modification of the fluid filter assembly of FIG. 1;

FIG. 11 is a fragmentary view of one of the back up plates of FIG. 10;

FIG. 12 is a fragmentary view of a modified form of the filter assembly illustrated in FIG. 10; and FIG. 13 is a cross-sectional view taken substantially along the line 13—13 of FIG. 12.

A filter element for a fluid filter in accordance with an exemplary constructed embodiment of the instant invention comprises a plurality of stacked plate assemblies that cooperate with one another to support and direct fluid flow to a plurality of filter membranes. Each plate assembly comprises an inlet plate, and a back up plate that are sealably secured to one another. A filter membrane is disposed between the inlet plate and the back up plate of adjacent plate assemblies.

A fluid filter in accordance with the instant invention utilizes a filter membrane that functions as a true depth filter, or in other words, retains any contaminants in the fluid system on one side of the membrane, and is therefore ideally suited for the filtration of relatively fine particles, for example, particles in the range of .005 to 5 microns, from a fluid system.

As discussed hereinbefore, it is imperative that proper support be given the filter membrane in a filter element utilizing such membranes. Failure of proper support may result in impingement failures or rupture of the filter membrane. Accordingly, the filter membrane utilized in the filter element of the instant invention is supported on the outlet side thereof by a novel land configuration on the back up plate. Also, the porting configuration of the inlet and back up plates of the plate assembly is such that the fluid pressure differential across the filter element is relatively constant. As contaminant deposits build up on the filter membrane, the configuration and orientation of the lands on the back up plate is such that the differential pressure across the membrane is relatively constant. In addition, the configuration and orientation of the filter membrane is such that it functions as a seal between adjacent plate assemblies thereby to insure the proper fluid flow pattern internally of the filter element.

The construction and orientation of the back up plate for the filter membrane in certain of the constructions is such that full loading of the filter membrane with contaminant effects complete choking off of fluid flow therethrough. Choke off is accomplished in such a manner that the integrity of the filter membrane is in no way jeopardized, thus precluding rupture thereof and dumping of contaminants into the fluid system.

More particularly, an annular filter element 10, in accordance with an exemplary constructed embodiment of the instant invention, is shown in operative condition within a filter housing 12. The filter housing 12 is of conventional construction comprising a cylindrical shell portion 14 having top and bottom caps 16 and 18, sealably secured thereto. A pair of inlet and outlet fittings 20 and 22, respectively, are secured to the shell 14, by any suitable means. The filter element 10 is supported between the inlet and outlet fittings 20 and 22 of the housing 12 by a mounting plate 24 that is seated on a complementary annular shoulder 26 on the shell 14 of the filter housing 12. A suitable O-ring 28 effects a fluid seal between the mounting plate 24 and the shell 14.

A threaded tie rod 30 extends vertically through the center of the annular filter element 10, through the mounting plate 24, and through a lower plate 32. The lower plate 32 is biased upwardly, as seen in FIGURE 1 of the drawings, by a nut 34 which is threadably engaged with the rod 30 and which bears against a suitable annular spacer 36. The lower plate 32 sealably biases the filter element 10 upwardly against the plate 24.

A top plate 40 is spaced from the mounting plate 24 by a pair of collars 42 and 44, suitable cap screws 46 and 48 extending therethrough to maintain the plates 40 and 24 in fixed relation. A suitable stud nut 50, having a threaded upper end portion 52 for the acceptance of a filter element puller (not shown), is threadably secured to an upper end portion 54 of the tie rod 30 to maintain the filter element 10 in compressed relationship between the mounting plate 24 and the lower plate 32.

As best seen in FIGURE 1, fluid flow through the annular filter element 10 is radially inwardly thereof, thence axially upwardly through a central passage therein, thence radially outwardly between the mounting plate 24 and the spacer plate 40.

As best seen in FIGS. 2-9 of the drawings, the filter element 10 comprises a plurality of stacked plate assemblies, generally designated by the numeral 60, having filter membranes 62 and back up membranes 64 interposed therebetween, respectively. The membrane 62 is preferably made from AM series cellulose acetate filter paper available from the Gelman Instrument Company. The back up membrane is preferably made from synthetic fiber paper, also available from the Gelman Instrument Company. It is to be noted that the filter and back up membranes 62 and 64 serve as fluid seals between adjacent plate assemblies 60, in addition to their filtration function, as will be discussed in greater detail hereinafter. Since the plate assemblies 60 are of like construction, only one plate assembly 60 will be discussed in detail for the purpose of clarity.

Each plate assembly 60 comprises a lower outlet or back up plate 70 and an upper or inlet plate 72. The plate 70 and 72 are preferably molded from a plastic that is impervious to chemical deterioration from the fluid being filtered, but it is to be understood that any material, natural or synthetic, may be utilized having the requisite thermal and chemical characteristics. The back up plate 70 has a pair of concentric weld beads 74 and 76 that are accepted in a complementary annular recess 78 in the upper plate 72, to facilitate spin welding of the plates 70 and 72 to one another. The spin weld between the plates 70 and 72 precludes the spurious passage of fluid radially inwardly of the filter plate assembly 60, as will be discussed.

As best seen in FIG. 5 of the drawings, a lower surface 80 of the inlet or upper plate 72 is provided with a plurality of circumferentially spaced radially inwardly extending passages or channels 82 that communicate with longitudinally extending bores 84, respectively. The bores 84 extend entirely through the inlet plate 72 so as to provide a fluid communication path from the radially outer peripheral surface of the filter element 10 through the passage 82 to a relatively wide and flat annular recess 86 on the top surface of the inlet plate 72. A recess 86 extends between a pair of annular sealing beads 88 and 90 on the radially outer and inner end portions of the top plate 72. Thus, fluid entering through the passage 82 in the top plate 72 passes upwardly through the bore 84 therein, thence radially inwardly of the filter element 10 within the recess 86 in the inlet plate 72. It is to be noted that the recess 86 in the inlet plate 72 immediately underlies the filter membrane 62 in closely spaced generally parallel relationship thereto. The spacing of the filter membrane 62 from the recess 86 is such that fluid tends to flow radially inwardly of the filter element 10 thus initially loading the filter membrane 62 at the radially innermost portion thereof, contaminants progressively building up on the membrane 62 radially outwardly thereof.

As best seen in FIG. 2, the lower or back up plate 70 has a pair of annular beads 98 and 99 at the radially inner and outer edge portions thereof, respectively, that are complementary to the bead portions 90 and 88 on the top plate 72 of an adjacent plate assembly 60 to sealingly retain the filter and back up membranes 62 and 64 therebetween.

As best seen in FIGS. 3 and 9 of the drawings, the back up plate 70 has a plurality of radially and circumferentially spaced lands 100 thereon, the bottom faces 102 of which engage and support the back up membrane 64. The circumferential spacing of the lands 100 is dictated by a plurality of radially extending grooves 104 that extend between the annular bead 99 on the radially outer peripheral edge of the back up plate 70 and the annular bead portion 98 at a radially inner edge thereof. An axially extending flange 112 extends downwardly from the bead portion 98 on the back up plate 70 to aid in positioning the plates 70 and 72 relative to one another to facilitate spin welding to form the plate assembly 60.

The radially extending grooves 104 communicate with a plurality of axially and circumferentially extending apertures 120 in the back up plate 70 thereby to provide a fluid communication path between the grooves 104 and a plurality of radially inwardly extending passages 122 on the back up plate 70. The passages 122 communicate with the hollow core of the filter element 10 which is defined primarily by the flange portions 112 on the back up plates 70 when the plate assemblies 60 are in the stacked condition.

As best seen in FIG. 9 of the drawings, the radial spacing of the lands 100 is dictated by a plurality of radially spaced concentric grooves 130, which are of like radial width and axial depth to the radial grooves 104. The grooves 130 provide for circumferential flow of fluid between adjacent radial grooves 104 to insure that uniform differential pressure conditions obtain circumferentially of each membrane 62.

As best seen in FIGS. 7 and 8 of the drawings, the lands 100 are softly rounded at the top faces thereof. In addition, the base of each land 100 is softly rounded into the radial grooves 104 and circumferential grooves 130. The rounded configuration of the lands 100 precludes the presentation of a sharp edge or corner to the back up membrane 64 thereby minimizing the chance of rupture of the back up and filter membranes 64 and 62 upon loading thereof, as will be discussed.

Further, as will be readily apparent from FIG. 2, the surface configuration of the lands presents a relatively thin support or contact line to the support surface of the filter membrane. In order to maintain the high efficiency of the filter membrane, it is desirable to maintain the land area in contact with the filter membrane at a minimum to preclude the blocking of the holes in the membrane during filtering. With the surface configuration and the land spacing of the instant modification, it has been found that the supported or blocked area of the filter membrane is approximately 2.7 percent of the total area, thus providing high filtering efficiency.

As best seen in FIGS. 7 and 8 of the drawings, when the lower surface of the filter membrane 62 is completely covered with contaminants, both the filter membrane 62 and back up membrane 64 are biased upwardly into the radial and circumferential grooves 104 and 130 in the back up plate 72 of the associated plate assembly 60. When this condition obtains, the passages 104 and 130 are effectively closed, precluding passage of fluid radially inwardly of the back up plate 72 and through the filter element 10. Thus, the filter membrane 62 and back up membrane 64 function as a choke off valve that moves into a closed condition when loaded with contaminants.

To insure the integrity of the membrane 62 and 64 in the "choke off" condition, it is important that the relationship of paper characteristics and back up plate configuration be maintained. In an exemplary constructed embodiment, using the membranes 62 and 64, the depth of the grooves 104 and 130 from the face 102 of the lands 100 is .030 inch. The width of radial grooves 104 is 0.30 inch and the width of the circumferential grooves 130 is .036 inch. The arcuate spacing of the grooves 104 is 3°.

In accordance with another feature of the instant invention, impingement failure of the membranes is precluded by relating the depth of the oil inlet channel 86 to the characteristics of the membranes 62 and 64 and of the lands 100. In an exemplary constructed embodiment, the depth of the oil inlet channel 86 is .030 inch from the plane of the beads 88 and 90 on the radially outer and inner edges of the inlet plate 72. The depth of the channel 86 is important in that flow radially inward thereof is relatively easier than through the filter membrane 62, thus encouraging initial fluid passage radially inwardly of the filter element 10. In this manner, contaminants are initially built up on the inlet side of the radially inner portion of the filter element 62, contaminant gradually building up radially outwardly thereof until the filter membrane 62 is completely loaded. At this time, the membranes 62 and 64 move to the choke off condition illustrated in FIG. 7 of the drawings.

In accordance with another feature of the instant invention, it is to be noted that the filter assembly 10 is dynamically balanced against large pressure differentials tending to collapse or tear the filter structure. In certain prior art systems, the assembly is so devised and constructed that relatively large forces are developed across relatively weak structural points or areas. As is particularly seen in FIG. 2, the filter assembly 10 of the instant invention is inherently dynamically balanced due to the nature of the pressures impressed on the plates 70, 72 and the manner in which the plates 70, 72 are held together, as for example by the bolt structure or tie rod 30.

In the assembly illustrated, if a 3000 pounds per square inch pressure were utilized in flowing material through the filter assembly 10, the pressure and resultant force would be impressed across both plates 70, 72. As is seen from FIG. 2, the 3000 p.s.i. pressure would be present in aperture 82, the bore 84 and the annular recess 86. A slight pressure drop across membranes 62, 64 would cause the pressure in the grooves 104, 130 to be at approximately the same pressure as the pressure in the recess 86. The land configuration acts to offset the resultant force of the pressure on the membranes 62, 64 and this reduced pressure is impressed in the spaces defined by aperture 122 and thus to the central bore within the assembly 10.

From the foregoing description, it is seen that the pressure force is exerted on both the upper and lower faces of the plates 72, 70 respectively and any crushing force due to the large pressure tends to compress plates 70, 72. However, there are substantially no interior spaces within the plates 70, 72 to permit the assembly to compress, thereby rendering the structure relatively immune to these resultant forces. Any resultant forces due to pressure tends to separate the plates 70, 72 from each other at a point defined within the central bore. However, this force is offset by the strength of the tie bolt 30 retaining the filter assembly together, the strength of the tie bolt being sufficient.

Referring now to FIGS. 10 to 13, there is illustrated a modified form of filter assembly 138, construction of FIGS. 1 to 9. It is to be noted that the general environment of the filter assembly 138 is the same as that described in conjunction with FIGS. 1 to 9. More particularly, the annular filter assembly 138 is intended to be mounted in operative condition within a filter housing, as for example filter housing 12. The filter housing may be of conventional construction comprising a cylindrical shell portion having top and bottom caps sealably secured thereto. A pair of inlet and outlet fittings are secured to the shell by any suitable means. The filter element 140 is supported between the inlet and outlet fittings of the housing by a mounting plate 141 which may be seated on a complementary annular shoulder on the shell of the filter housing. A suitable fluid seal between the mounting plate 141 and the shell may be provided, as described above.

Referring particularly to the filter assembly 138, illustrated in FIG. 10, a threaded tie rod 140 extends vertically through the center of the annular filter element 138, and may be attached to the mounting plate 141, discussed above, and through a lower plate 142. The lower plate 142 is biased upwardly, as seen in FIGURE 10 of the drawings, by a nut 144 which is threadably engaged with the rod 140 and which bears against a suitable annular spacer 143. The lower plate 142 sealably biases the filter element 10 upwardly against the plate 141.

A top plate 145 is spaced from the mounting plate 141 by a pair of collars 146 and 147, suitable cap screws 148 and 149 extending therethrough to maintain the plates 145 and 141 in fixed relation. A suitable stud nut 150, having a threaded upper end portion 152 for the acceptance of a filter element puller (not shown), is threadably secured to an upper end portion 154 of the tie rod 140 to maintain the filter element 138 in compressed relationship between the mounting plate 141 and the lower plate 142.

As best seen in FIGURE 10, fluid flow through the annular filter element 138 is radially inwardly thereof, thence axially upwardly between the mounting plate 141 and the spacer plate 145.

As best seen in FIGURE 10 of the drawings, the filter element 138 comprises a plurality of stacked plate assemblies, generally designated by the numeral 160, having filter membranes 162 and back up membranes 164 disposed on either side thereof. As in the situation with FIGS. 1 to 9, the membrane 162 is preferably made from AM series cellulose acetate filter paper available from the Gelman Instrument Company. The back up membrane is also preferably made from synthetic fiber paper, also available from the Gelman Instrument Company. It is to be noted that the filter and back up membranes 162 and 164 serve as fluid seals between adjacent plate assemblies 160, in addition to their filtration function, as will be discussed in greater detail hereinafter. Since the plate assemblies 160 are of like construction, only one plate assembly 160 will be discussed in detail for the purpose of clarity.

Each plate assembly 160 comprises a back up plate 170 and an inlet annular ring 172. The plate 170 is preferably molded from a plastic that is impervious to chemical deterioration from the fluid being filtered. Also, the plate 170 may be formed of metals, or synthetic materials having the requisite characteristics. The assembly 160 further includes a plurality of inner, annular spacer members 174 for spacing and sealing the inner edges of the filter membranes 162, 164 and a further plurality of inner spacer members 176 to suitably space and seal the filter backing plates 170, one from the other.

As best seen in FIG. 10 of the drawings, a central portion 180 of the inlet ring 72 is provided with a plurality of circumferentially spaced radially inwardly extending passages or channels 182 that communicate with longitudinally extending bores 184, respectively. The bores 184 extend entirely adjacent the plate 172 so as to provide a fluid communication path from the radially outer peripheral surface of the filter element 138 through the passage 182 to the relatively wide and flat annular recess 184 on the surface of the inlet plate 170 and filter membrane 162. The recess 184 extends between the pair of annular sealing elements 172, 176 on the radially outer and inner edge portions of the plate 170. Thus, fluid entering through the passage 182 in the ring 172 passes upwardly through the bore 84 therein, thence radially inwardly of the filter element 10 within a recess 186 formed in the plate 170. It is to be noted that the recess 186 in the plate 170 immediately underlies the filter membranes 162, 164 in closely spaced generally parallel relationship thereto. The spacing of the filter membranes 162, 164 from the recess 186 is such that fluid tends to flow radially inwardly of the filter element 138, thus initially loading the filter membrane 162 at the radially innermost portion thereof, contaminants progressively building up on the membrane 162 radially outwardly thereof.

As best seen in FIG. 10, the back up plate 170 has a pair of annular beads 198 and 199 at the radially outer edge portion thereof, that are complementary to the bead portions 198 and 199 on the plate 170 of an adjacent plate assembly to coact with the rings 172 to sealably retain the filter and back up membranes 162 and 164 therebetween. The inner edge of the membranes 162, 164 are similarly sealed between rings 174, 176.

As best seen in FIG. 11 of the drawings, the back up plate 170 has a plurality of radially and circumferentially spaced lands 200 formed on both faces thereof, faces 202 of which engage and support the back up membrane 164. The circumferential spacing of the lands 200 is dictated by a plurality of radially extending grooves 204 that extend between the annular bead 198, 199 on the radially outer peripheral edge of the back up plate 170 and the radially inner edge thereof.

The radially extending grooves 104 communicate with the plurality of axially and circumferentially extending apertures 220 formed adjacent the inner edge of the back up plate 170 thereby to provide a fluid communication path between the grooves 204 and a plurality of radially outwardly extending passages 222 on the back up plate 170. The passages 222 communicate with the hollow core of the filter element 138 which is defined primarily by the inner edges of the rings 174 when the plate assemblies 160 are in the stacked condition.

As best seen in FIGURE 11 of the drawings, the radial spacing of the lands 200 is dictated by a plurality of radially spaced concentric grooves 230, which are of like radial width and axial depth to the radial grooves 204. The grooves 230 provide for circumferential flow of fluid between adjacent radial grooves 204 to insure that uniform differential pressure conditions obtain circumferentially of each membrane 162.

The lands 200 are softly rounded at the top faces thereof, as was described in conjunction with FIGS. 1 to 9. In addition, the base of each land 100 is softly rounded into the radial grooves 204 and circumferential grooves 230. The rounded configuration of the lands 200 precludes the presentation of a sharp edge or corner to the back up membrane 164 thereby minimizing the chance of rupture of the back up and filter membranes 164 and 162 upon loading thereof, as will be discussed.

As was described in conjunction with FIGS. 7 and 8 of the drawings, when the lower surface of the filter membrane 162 is completely covered with contaminants, both the filter membrane 162 and back up membrane 164 are biased upwardly into the radial and circumferential grooves 204 and 230 in the back up plate 170 of the associated plate assembly 160. When this condition obtains, the passages 204 and 230 are effectively closed, precluding passage of fluid radially inwardly of the back up plate 170 and through the filter element 138. Thus, the filter membrane 162 and back up membrane 164 function as a choke off valve that moves into a closed condition when loaded with contaminant.

Referring now to FIGS. 12 and 13, there is illustrated a modified form of the filter assembly 138 illustrated in FIGS. 10 and 11. In the modification of FIGS. 12 and 13, a filter assembly 238 includes a relatively flat member 240 having an inner 242 and outer 244 annular flange is provided in lieu of the back up plate 170. An upper annular recess 246 and a lower annular recess 248 is formed between the flanges and is adapted to receive a pair of screen members 250. The screen member is utilized to support backup filter membrane 252 and a main filter membrane 254 positioned in parallel relation to the plate 240. The screen may take any form, as for example an interwoven mat of metal fibers or may take the shape of a plate formed with generally wavy undulations with holes perforating the sides of the undulations.

As in the situation with FIGURE 10, an outer, annular spacer ring 258 is inserted between adjacent filter assemblies having a plurality of inlet apertures 260 formed therein, the ring being utilized to space and seal adjacent filter assemblies 238 and to provide an inlet passage to a cavity or recess 262 formed between the assemblies 238. Similarly, an inner spacer ring 266 is formed with a radially extending flange 268 for a similar purpose.

The screen 250 is so formed as to provide a fluid passage between the filter membranes 252, 254 and the face of plate 240 thus providing an axial flow path from the cavity 262, through the filter membranes 252, 254 and through the screen 250 to the face of plate 240. The flow of filtrate is then radial adjacent the face of the plate 240 to a plurality of circumferentially and axially spaced outlet apertures 270 formed in spacer members 266. Thus the filtrate is exited to the central bore of the assembly 238 to be passed to the exterior of the filter assembly, as described above.

From the foregoing description, it should be apparent that the filter element of the instant invention offers a material step forward in the filter art. The filter element is capable of separating contaminants in the range of .005 to 5 microns from a fluid while insuring the integrity of the filter membrane. Piercing or impingement failures of the filter membrane are precluded in that the direction of flow of the fluid immediately prior to passage through the membrane is in a direction substantially normal to the direction of fluid flow through the membrane. In other words, the impingement velocity of the fluid immediately prior to passage through the membrane is minimized.

The total face area of the lands in engagement with the unloaded portion of the filter membrane increases radially outwardly of the back up plate as the membrane loads radially outwardly with contaminant. Thus, flow is controlled through the filter element in such a manner that differential pressure variations thereacross are minimized.

Complete choke off of fluid through the filter element is achieved upon loading of the filter membrane with contaminant by utilizing the membrane itself as a choke off valve that is movable into the outlet passages in the back up plates to close these passages. The configuration of the back up plates is such that the integrity of the filter membrane is maintained despite movement into the channel surrounding the back up lands.

Another feature of this mode of operation is that critical loading of the filter can be easily recognized. The relatively sudden cut-off results in a relatively rapid pressure drop across the filter element which is directly related to the degree of filter loading.

Filter elements of varying loading capacity can be achieved by simply adding or subtracting plate assemblies and membranes. Thus, flexibility in meeting application requirements is maximized and yet the number of different component parts is reduced to a minimum.

A filter element in accordance with the instant invention sets a heretofore unknown standard of efficiency in the filtration of contaminants from a fluid system. By carefully controlling every facet of the filtering process, the overall capability of the filter element to cleanse a fluid system is maximized.

It is to be understood that the specific constructions of the improved filter herein disclosed and described are presented for the purpose of explanation and illustration and are not intended to indicate the limits of the invention, the scope of which is defined by the following claims.

What is claimed is:

1. In a fluid filter having a fluid inlet and a fluid outlet, filter assembly means for filtering fluid flowing from said inlet to said outlet, said filter assembly comprising a filter medium, and backing means for supporting said filter medium between the inlet and the outlet including a backing plate having an area generally coextensive with said filter medium, said backing plate including a plurality of projections extending from said backing plate toward said filter medium forming grooves in an area between said filter medium and said backing plate, said projections being relatively closely spaced and relatively shallow so that, if the pressure differential across said filter medium becomes sufficiently great, said filter medium will not be self-supporting and will enter said grooves to supportingly seat in said grooves, said filter medium and said backing plate coacting to fully support said filter medium and prevent rupture of said filter medium upon seating in said grooves.

2. The filter assembly means of claim 1 including means for supporting said filter medium in fluid transmitting condition and effective when the pressure differential across said filter medium becomes sufficiently great for effectively fully supporting the entire filter medium for preventing rupture of said filter medium.

3. The filter assembly of claim 1 wherein said backing plate and said projections are formed as an integral unit.

4. The filter assembly of claim 1 wherein said projections as formed from a plurality of grooves formed in said backing means wherein said filter membrane is movable into said grooves to close said grooves and block the flow of fluid upon the loading of said membrane with contaminants.

5. The filter assembly of claim 4 wherein at least a portion of said grooves are generally radially extending and in fluid communication with said outlet.

6. The filter assembly of claim 4 wherein said projections are defined by a plurality of relatively closely spaced lands, said lands being defined in part by a plurality of circumferentially spaced radially extending grooves and in part by a plurality of concentric radially spaced circumferential grooves.

7. The filter assembly of claim 6 wherein the edge portion of said lands facing said membrane are rounded to preclude rupture.

8. The filter assembly of claim 6 wherein said radial grooves are formed at the same level in said backing means as compared to said circumferential grooves.

9. The filter assembly of claim 8 wherein said radial grooves are of such depth so that said membrane is movable thereinto to close said radial grooves upon loading of said membrane with contaminants.

10. The filter assembly of claim 4 wherein said grooves are formed on two sides of said backing means for providing substantially radial flow to the fluid outlet on both sides of said backing means.

11. The filter of claim 10 wherein said filter further includes an outer annular ring having inlet ports formed radially thereof and forming a spacer member for axially spacing said filter assemblies, said axial spacing providing an annular cavity between pairs of said filter assemblies, said spacer member coacting with an outer portion of said backing means for totally sealing the outer edge of said filter membranes.

12. The filter of claim 11 further including an inner, annular spacer member for spacing the inner portions of said filter assembly and forming said cavity.

13. The filter of claim 12 wherein said projections are defined by a plurality of relatively closely spaced lands, said lands being defined in part by a plurality of circumferentially spaced radially extending grooves and in part by a plurality of concentric radially spaced circumferential grooves.

14. The filter of claim 13 wherein said radial grooves are of such depth so that said membrane is movable thereinto to close said radial grooves upon loading of said membrane with contaminants.

15. The filter assembly of claim 1 wherein said backing means includes a back up plate having a plurality of closely spaced grooves on one side thereof defining a plurality of lands for the support of the outlet side of one of said membrane, said back up plate having an aperture communicating with the grooves on the one side thereof to conduct fluid away from said membrane, and an inlet plate having one side thereof sealably secured to the other side of said back up plate, the other side of said inlet plate having an inlet passage communicating with the inlet side of an adjacent filter membrane to conduct fluid thereto whereby a plurality of said membranes and plate assemblies can be stacked in alternate relationship.

References Cited

UNITED STATES PATENTS

| | | | |
|---|---|---|---|
| 1,331,732 | 2/1920 | Wait | 210—321 X |
| 2,903,136 | 9/1959 | Buckman | 210—492 X |
| 3,083,834 | 4/1963 | Pall | 210—343 X |
| 3,173,867 | 3/1965 | Michaels | 210—492 X |

FOREIGN PATENTS

| | | |
|---|---|---|
| 655,385 | 7/1951 | Great Britain. |
| 773,588 | 5/1957 | Great Britain. |
| 107,192 | 10/1924 | Switzerland. |

REUBEN FRIEDMAN, *Primary Examiner.*

F. SPEAR, *Assistant Examiner.*

UNITED STATES PATENT OFFICE
CERTIFICATE OF CORRECTION

Patent No. 3,343,681                                September 26, 1967

Eugene Madden

It is hereby certified that error appears in the above numbered patent requiring correction and that the said Letters Patent should read as corrected below.

Column 4, line 30, for "end" read -- edge --; line 48, for "sealingly" read -- sealably --; line 75, for "dictanted" read -- dictated --; column 8, line 36, after "flat" insert -- plate --; column 9, line 10, after "fluid" insert -- flow --; line 67, for "as" read -- are --; line 74, after "said" insert -- fluid --.

Signed and sealed this 7th day of January 1969.

(SEAL)
Attest:

Edward M. Fletcher, Jr.                            EDWARD J. BRENNER
Attesting Officer                                      Commissioner of Patents